United States Patent [19]
Hsu et al.

[11] Patent Number: 5,181,270
[45] Date of Patent: Jan. 19, 1993

[54] OPTICAL FIBER CANISTER

[75] Inventors: Hui-Pin Hsu, Northridge; Ronald B. Chesler, Woodland Hills, both of Calif.

[73] Assignee: Hughes Aircraft Company, Los Angeles, Calif.

[21] Appl. No.: 742,815

[22] Filed: Aug. 9, 1991

[51] Int. Cl.⁵ .............................. G02B 6/16
[52] U.S. Cl. .................. 385/134; 385/123; 244/3.12; 244/3.16
[58] Field of Search ............ 385/134, 123, 147; 244/3.12, 3.16

[56] References Cited

U.S. PATENT DOCUMENTS

| 4,957,344 | 9/1990 | Chesler et al. | 385/134 X |
| 4,995,698 | 2/1991 | Myers | 385/134 X |
| 5,005,930 | 4/1991 | Schotter | 385/134 |
| 5,029,959 | 7/1991 | Stubbs | 385/134 |
| 5,029,960 | 7/1991 | Hulderman et al. | 385/134 |

Primary Examiner—John D. Lee
Assistant Examiner—Phan Thi Heartney
Attorney, Agent, or Firm—R. M. Heald; C. D. Brown; W. K. Denson-Low

[57] ABSTRACT

The bobbin of an optical fiber canister is constructed so that the thermal expansion coefficient of the bobbin is matched to that of the optical fiber pack wound upon the bobbin. In one embodiment, an optical fiber canister (20) has a bobbin (22) in the shape of a frustoconical shell (24) with a flange (26) at one end of the shell (24), the bobbin (22) having a slot (34) through the shell (24) and the flange (26) extending longitudinally parallel to the axis (28) of the shell (24). In another embodiment, an optical fiber canister (50) has a bobbin (52) in the shape of a frustoconical shell (54) with a flange (56) at one end of the shell (54), the bobbin (52) being formed of at least two layers (62) of structural fiber (60) material helically wound and adhesively bonded into the shape of the shell (54). The structural fiber (60) material is selected to have substantially the same thermal expansion properties as optical fiber material, and may in fact be optical fiber. The two approaches may be combined, with the structural fiber of the second embodiment being helically wound onto a slotted shell (84) such as used in the first embodiment.

12 Claims, 3 Drawing Sheets

OPTICAL FIBER CANISTER

BACKGROUND OF THE INVENTION

This invention relates to optical fibers, and, more particularly, to the bobbins and supports upon which optical fibers are wound prior to payout.

Optical fibers are strands of glass fiber processed so that light transmitted therethrough is subject to total internal reflection. A large fraction of the incident intensity of light directed into the optical fiber is received at the other end of the optical fiber, even though the optical fiber may be hundreds or thousands of meters long. Optical fibers have shown great promise in communications applications, because a high density of information may be carried along the optical fiber and because the quality of the signal is less subject to external interferences of various types than are electrical signals carried on metallic wires. Moreover, the glass fibers are light in weight and made from a highly plentiful substance, silicon dioxide.

Glass optical fibers are typically fabricated by preparing a preform of glasses of two different optical indices of refraction, one inside the other, and processing the preform to a fiber. The optical fiber is coated with a polymer layer termed a buffer to protect the glass from scratching or other damage. As an example of the dimensions, in a typical configuration the diameter of the glass optical fiber is about 125 micrometers, and the diameter of the optical fiber plus the polymer buffer is about 250 micrometers (approximately 0.010 inches).

For such very fine optical fibers, the handling of the optical fiber to avoid damage that might reduce its mechanical strength properties becomes an important consideration. In one approach, the optical fibers are wound onto a cylindrical or tapered cylindrical bobbin, generically termed a frustoconical bobbin, with many turns adjacent to each other in a side by side fashion. After one layer is complete, another layer of optical fiber is laid on top of the first layer, and so on. A weak adhesive is typically applied to the layers of optical fiber, to hold them in place. The final assembly of the bobbin and the wound layers of optical fiber is termed a canister, and the mass of wound optical fiber is termed the fiber pack. When the optical fiber is later to be used, the fiber is paid out from the canister in a direction parallel to the axis of the cylinder.

The canisters must sometimes be stored for extensive periods of time at extreme conditions. In one important application, the canisters are used in optical fiber-guided missiles. The missiles must be storable at low or high temperatures, and then immediately operable upon demand in the very low temperatures found at high elevations or in the high temperatures found in desert conditions. Procurement specifications for missiles reflect this requirement for storability and operability through temperatures extremes. In one example, a missile must be storable and operable at temperatures ranging from −40° C. to +55° C.

When the optical fiber canister is heated and cooled at various times in testing, storage, or service, the optical fiber pack may degrade due to the thermal expansion difference between the optical fiber and the bobbin upon which it is wound. The optical fiber pack expands by different amounts in the axial and circumferential directions. In the axial direction, the thermal expansion coefficient of the optical fiber pack is dominated by that of the buffer material, and is relatively large. In the circumferential direction, the thermal expansion coefficient of the optical fiber pack is dominated by that of the glass, and is relatively small. Thus, there is typically a difference in either or both directions between that of the optical fiber pack and the bobbin.

Where there is a difference in thermal expansion between the optical fiber pack and the bobbin in any direction, there may develop folds, cracks, or other types of mechanical instabilities in the optical fiber pack during storage. Then, when the optical fiber is to be dispensed, the payout may be irregular so that the optical fiber can snarl. In extreme cases the optical fiber may break as a result of the instabilities created in the optical fiber pack due to the irregularities induced by the temperature changes, rendering the entire optical fiber and missile useless. Even one such fatal irregularity in thousands of meters of optical fiber is sufficient to cause such a failure. It is therefore important to take care to ensure that mechanical instability due to differences in thermal expansion are not present.

Thus, there is a need for an optical fiber canister which is not subject to formation of mechanical instabilities as a result of temperature changes during testing, storage, and use. This need is particularly acute for compact dispensers that are used to store and dispense very long lengths, typically many kilometers, of optical fiber. The present invention fulfills this need, and further provides related advantages.

SUMMARY OF THE INVENTION

The present invention provides an optical fiber canister having a bobbin whose thermal expansion coefficient is closely matched to that of the optical fiber pack in both the axial and circumferential directions. Faults in the optical fiber pack due to thermal expansion differences are minimized. The canister is therefore readily tested, stored, and used over a range of temperatures and after multiple thermal cycles.

In accordance with one embodiment of the invention, an optical fiber canister comprises a bobbin in the shape of a frustoconical shell with a flange at one end of the shell, the bobbin having a slot through the shell and the flange extending longitudinally parallel to the axis of the shell. In this embodiment, the bobbin shell is preferably made of a material that has a thermal expansion coefficient comparable to the thermal expansion coefficient of the optical fiber pack in the axial direction. The slot in the shell permits the bobbin to expand and contract circumferentially at the same rate as the optical fiber pack in its circumferential direction.

In accordance with another embodiment of the invention, an optical fiber canister comprises a bobbin in the shape of a frustoconical shell with a flange at one end of the shell, the bobbin being formed of at least two layers of structural fiber material helically wound and adhesively bonded into the shape of the shell. The structural fiber material is selected to have substantially the same thermal expansion properties as optical fiber material, and may be optical fiber material. In this approach, a strand of structural fiber material having the same thermal expansion properties as optical fiber material is wound into a helical form and bonded with a strong adhesive to form a self-supporting bobbin structure.

The two embodiments may be integrated together, to form a compound bobbin having a slotted shell with an overwinding of structural fiber material having substantially the same thermal expansion properties as the optical fiber. In accordance with this embodiment, an optical fiber canister comprises a bobbin in the shape of a frustoconical shell with a flange at one end of the shell, the bobbin having a slot through the shell and the flange extending longitudinally parallel to the axis of the shell, and further having at least one layer of structural fiber material helically wound upon and adhesively bonded to the shell. The structural fiber material has substantially the same thermal expansion properties as optical fiber material.

The approach of the invention provides an optical fiber canister with axial and circumferential coefficients of thermal expansion matched to those of the overwound optical fiber pack. There is therefore little tendency to form faults in the optical fiber pack related to thermal expansion differences with the bobbin. Other features and advantages of the invention will be apparent from the following more detailed description of the preferred embodiments, taken in conjunction with the accompanying drawings, which illustrate, by way of example, the principles of the invention.

DETAILED DESCRIPTION OF THE INVENTION

Figure 1:
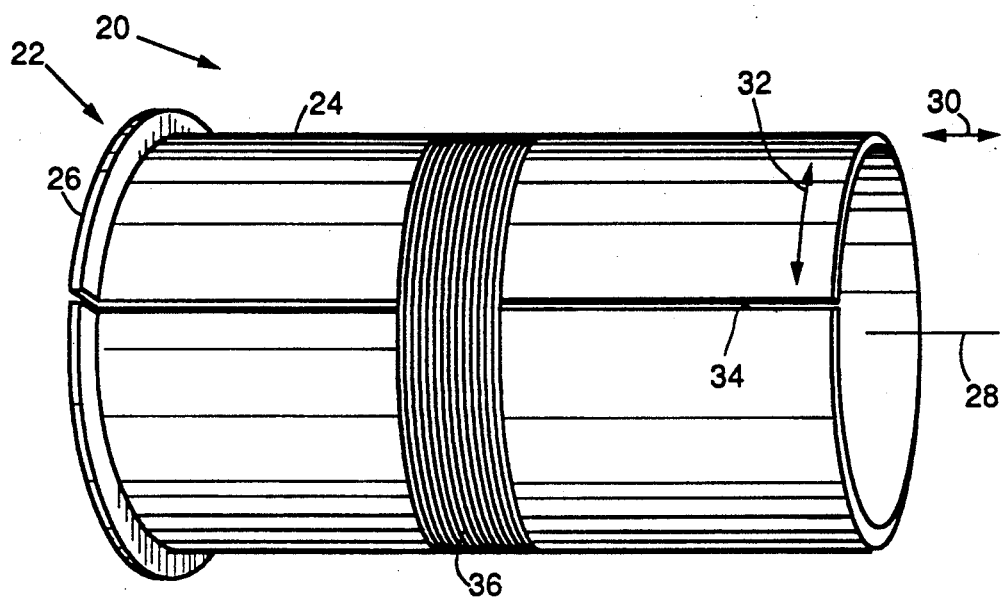
FIG. 1 is a perspective view of an optical fiber canister using a bobbin with a slotted shell.
Figure 2:
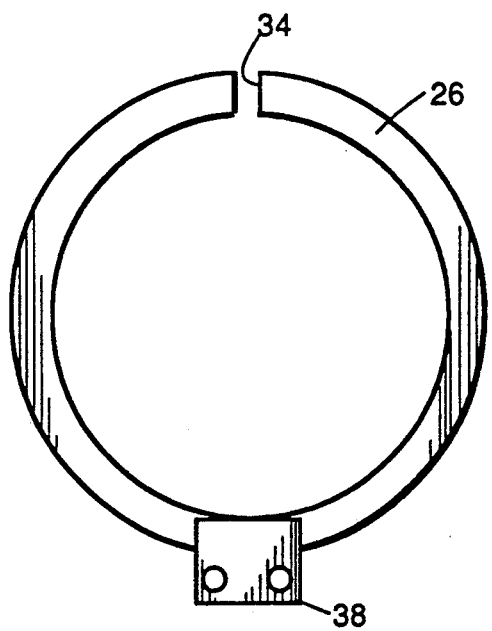
FIG. 2 is an end view of the optical fiber canister of FIG. 1, from the flange end.

In a first preferred embodiment of the invention, shown in FIGS. 1 and 2, an optical fiber canister 20 includes a bobbin 22 in the form of a frustoconical shell 24 having a flange 26 at one end. As used herein, the term "frustoconical shell" includes shells that are cylinders or frustums of cones. That is, the shell may have opposing sides that are parallel to each other, in which case the shell is a cylinder, or may have opposing sides that are slightly tapered toward each other, in which case the shell is a frustum of a cone. The shell 24 of FIG. 1 may be either a cylinder or a frustum of a cone. In either case, the shell 24 has an axis 28, and there may be defined an axial direction 30 and a circumferential direction 32. Fiber optical bobbins are typically either cylinders or frustums of cones with the conical angle less than 5 degrees.

The frustoconical shell 24 has a slot 34 extending the length of the shell 24 parallel to the axial direction 30. The slot 34 extends through the thickness of the shell 24, and along its entire length and through the flange 26, as depicted in FIGS. 1 and 2. An optical fiber is wound in a helical, layered array over the shell 24 to form an optical fiber pack 36. (Only a small portion of the optical fiber pack 36 is shown in FIG. 1, so that the slot 34 may be seen.)

The frustoconical shell 24 is preferably made of a material whose coefficient of thermal expansion closely matches that of the optical fiber pack 36 in the axial direction 30. Examples of acceptable materials of construction of the frustoconical shell 24 in this embodiment are nylon, acrylic, polystyrene, epoxy, and aluminum. As a result, when the canister 20 is heated or cooled, there is little stress or strain introduced into the optical fiber pack 36 as a result of a differential in expansion coefficient between the optical fiber pack 36 and the frustoconical shell 24.

The thermal expansion coefficient of the optical fiber pack 36 is typically much larger in the axial direction 30 than in the circumferential direction 32. Fabricating the shell 24 from such a material matched to the axial coefficient of thermal expansion of the optical fiber pack 36 results in a coefficient of thermal expansion of the shell 24 that is much larger than that of the optical fiber pack 36 in the circumferential direction 32.

Absent the slot 34, the shell 24 would exert a tensile circumferential hoop stress on the optical fiber pack 36 when the canister is heated, and would shrink away from the optical fiber pack 36 when the canister is cooled. To prevent these undesirable results, the optical fiber pack 36 is wound onto the shell 24 with the opposing edges of the slot 34 forced together slightly, so that any subsequent cooling does no more than cause the edges of the slot 34 to retract away from each other, but not from the optical fiber pack 36. The width of the slot 34 is made sufficiently large so that when the canister is heated, the expansion of the shell 24 will not cause the opposing edges of the slot 24 to come into contact with each other. Because the shell 24 contacts the inside portion of the optical fiber pack 36 and has the slot 34, its expansion or contraction during heating or cooling cannot be different from that of the optical fiber material of the optical fiber pack 36.

When the optical fiber pack 36 is wound onto the shell 24, a weak adhesive may be applied to the optical fiber to aid in keeping it in place and achieving a well-controlled dispense. Care is taken that none of this weak adhesive binds the optical fiber pack 36 to the surface of the shell 24. If such binding were to occur, the proper expansion and contraction of the shell 24 might be prevented, since the shell 24 could not slip relative to the optical fiber pack 36.

The canister 20 must be attached to the structure of a carrying vehicle, such as a missile. The attachment must be accomplished so that the attachment does not interfere with the expansion and contraction of the shell 24. A preferred approach is illustrated in FIG. 2. A bracket 38 is fastened to the flange 26 (which in turn supports the shell 24) at a location generally diametrically opposed to the point on the flange 26 where the slot 34 is located. The bracket 38 has bolt holes or other attachment means by which it and the bobbin 22 may be attached to supporting structure (not shown). Using a single support bracket permits the remainder of the shell 24 to expand and contract freely.

Figure 3:
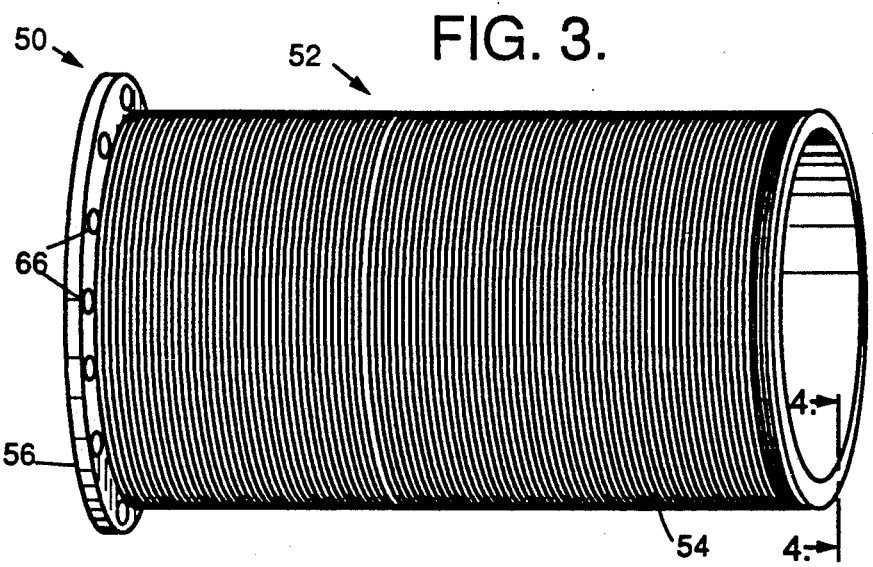
FIG. 3 is a perspective view of an optical fiber canister using a bobbin formed of layers of helically wound structural fibers.
Figure 4:
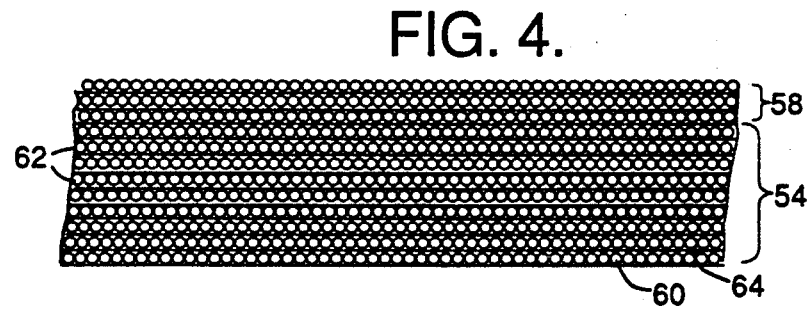
FIG. 4 is a sectional view of the optical fiber canister of FIG. 3, taken along lines 4—4.

Another approach and embodiment are illustrated in FIGS. 3 and 4. Here, a canister 50 includes a bobbin 52 having a frustoconical shell 54 and a flange 56 at one end of the shell 54. The shell 54 is made of a material having axial and circumferential coefficients of thermal expansion substantially identical to the optical fiber of an optical fiber pack 58 that is wound onto the shell 54.

The preferred material for fabricating the shell 54 is a structural fiber 60 that is structurally identical to the optical fiber material itself. When optical fiber material is fabricated, it must meet stringent mechanical and optical requirements. In some cases, the manufactured optical fiber material may have sufficient mechanical strength but be optically flawed so that it cannot be used as optical fiber. This fiber makes an ideal structural material for fabricating the shell 54.

To fabricate the shell 54 in this manner, a removable mandrel (not shown) is wrapped with at least one, preferably two or more, and typically a plurality of layers 62 of the structural fiber 60. The structural fiber 60 and the layers 62 are coated with a strong structural adhesive such as epoxy, which bonds the adjacent turns of the structural fiber 60 and the adjacent layers 62 together to form the ridig shell 54. Optionally, axially extending reinforcing strips 64 of a material such as acetate may be placed between adjacent layers 62, to increase the bending strength of the shell 54. The flange 56 is also formed of the structural fiber 60 material. To attach the bobbin 52 to a support (not shown), a bracket such as the bracket 38 of FIG. 2, or a conventional bolt hole pattern 66 can be provided in the flange 56, as shown in FIG. 3.

Because the shell 54 is made of structural fibers 60 that are identical or very similar to the optical fibers of the optical fiber pack 58, care is taken so that the optical fibers do not bond to the structural fibers. The shell 54 is formed and its strong adhesive completely cured prior to the winding of the optical fiber pack 58 and application of the weak adhesive, if any, used with the optical fiber.

Figure 5:
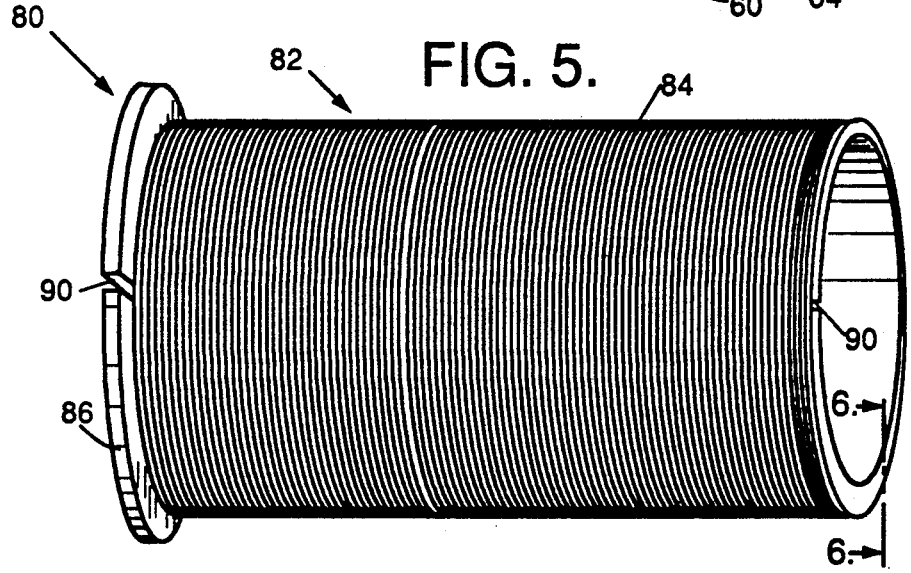
FIG. 5 is a perspective view of an optical fiber canister using a bobbin with a slotted shell overwound with layers of helically wound structural fibers.
Figure 6:
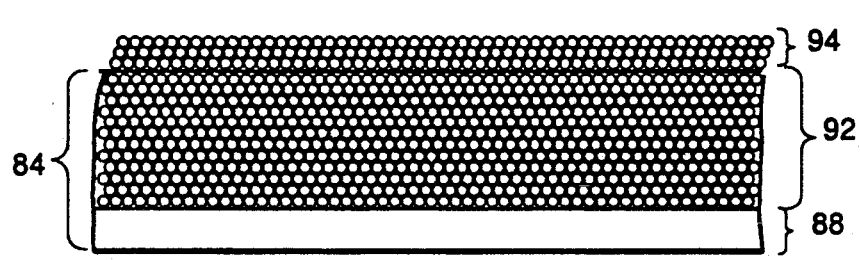
FIG. 6 is a sectional view of the optical fiber canister of FIG. 5, taken along lines 6—6.

Yet another approach and embodiment are illustrated in FIGS. 5 and 6. This embodiment combines features from each of the two previously discussed embodiments. A canister 80 includes a bobbin 82, which includes a shell 84 and a flange 86 at one end of the shell 84. The shell 84 is formed of two parts, an inner shell 88 having a slot 90 extending through the inner shell 88 and the flange 86, as discussed for the embodiment of FIGS. 1 and 2, and an outer shell 92 formed of a structural fiber material in the manner discussed previously in relation to the embodiment of FIGS. 3 and 4. (However, no reinforcing strips comparable to the reinforcing strips 64 of FIG. 4 are used.) An optical fiber pack 94 is wound overlying the shell 84. This construction technique affords greater strength to the shell 84 than would be possible with the embodiment of FIGS. 3 and 4. The canister 80 is preferably fastened to a support structure (not shown) using a bracket like that of the bracket 38 of FIG. 2.

Figure 7:
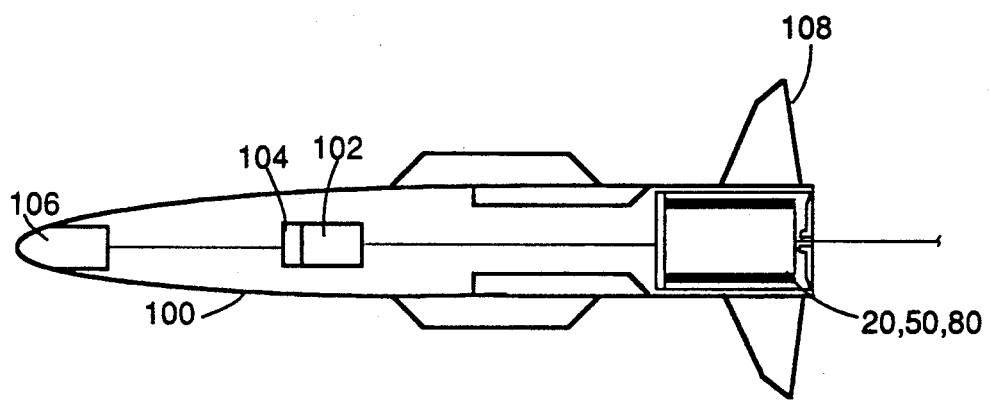
FIG. 7 is a schematic view of a missile with an optical fiber canister.

The three canisters 20, 50, and 80 all reduce the incidence of faults in the optical fiber pack due to thermal expansion differences. In a preferred application of most interest, these canisters 20, 50, 80 may be mounted within the interior of a missile 100, illustrated in FIG. 7. One end of the optical fiber extends rearwardly from the missile 100 to a ground station or moving launch platform. The other end is connected to a send/receive unit 102, which is connected to a microprocessor 104 that receives information from sensors 106 on the missile 100 and sends control commands to aerodynamic surfaces such as fins 108 on the missile 100.

The missile may experience a wide range of temperatures during testing, storage, and operation, and at least several temperature cycles. The canisters 20, 50, and 80 all reduce the likelihood that these temperatures and temperature excursions will damage the optical fiber pack so as to interfere with optical fiber dispense. Although particular embodiments of the invention have been described in detail for purposes of illustration, various modifications may be made without departing from the spirit and scope of the invention. Accordingly, the invention is not to be limited except as by the appended claims.

What is claimed is:

1. An optical fiber canister, comprising:
   a bobbin formed in the shape of a frustoconical shell having a pair of spaced-apart ends and a longitudinal axis extending through said shell between said ends;
   an optical fiber pack wound on said frustoconical shell, wherein said frustoconical shell is constructed of a material having a coefficient of thermal expansion closely matching the coefficient of thermal expansion of said optical fiber pack in a direction parallel to said longitudinal axis; and
   a slot extending the entire length of said frustoconical shell between said spaced-apart ends, said slot extending completely through a wall of said shell;
   whereby said slot allows said frustoconical shell to expand and contract circumferentially at the same rate as the optical fiber pack expands and contracts in the circumferential direction.

2. The canister of claim 1, wherein the frustoconical shell is a cylinder.

3. The canister of claim 1, wherein the frustoconical shell is a frustum of a cone.

4. The canister of claim 3, wherein the flange is at the large end of the frustum of the cone.

5. The canister of claim 1, further comprising:
   means for attaching the bobbin to a support.

6. The canister of claim 5, wherein the means for attaching is a bracket affixed to the flange at a location diametrically opposite to the slot.

7. The canister of claim 1, further comprising a flange attached to one of said shell ends, said flange extending outwardly from said shell in a direction substantially perpendicular to said longitudinal axis.

8. The canister of claim 1, further comprising:
   at least two layers of structural fiber material wound helically onto the frustoconical shell and adhesively bonded to the shell, the structural fiber material having substantially the same thermal expansion properties as optical fiber material.

9. The canister of claim 8, wherein the structural fiber material is the same material as optical fiber material.

10. The canister of claim 1, wherein said slots extends substantially parallel to said longitudinal axis.

11. An optical fiber canister, comprising a bobbin in the shape of a frustoconical shell with a flange at one end of the shell, the bobbin having a slot extending completely through the shell and completely through the flange with the slot extending longitudinally parallel to the axis of the shell, and further having at least one layer of structural fiber material helically wound upon and adhesively bonded to the shell, the structural fiber material having substantially the same thermal expansion properties as an optical fiber, pack wound upon the shell.

12. The canister of claim 11, wherein the structural fiber material is the same material as optical fiber material.

* * * * *